(12) United States Patent
Okawa et al.

(10) Patent No.: US 9,330,692 B2
(45) Date of Patent: May 3, 2016

(54) CONFINEMENT MAGNETIC CAP

(71) Applicant: HGST Netherlands B.V., Amsterdam (NL)

(72) Inventors: Norihiro Okawa, Odawari (JP); Kojiro Komagaki, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/341,737

(22) Filed: Jul. 25, 2014

(65) Prior Publication Data

US 2016/0027458 A1    Jan. 28, 2016

(51) Int. Cl.
*G11B 5/39* (2006.01)
*G11B 5/11* (2006.01)

(52) U.S. Cl.
CPC ............ *G11B 5/3929* (2013.01); *G11B 5/3912* (2013.01); *G11B 2005/3996* (2013.01); *Y10S 977/935* (2013.01)

(58) Field of Classification Search
None
See application file for complete search history.

(56) References Cited

U.S. PATENT DOCUMENTS

| | | | |
|---|---|---|---|
| 6,344,954 B1 * | 2/2002 | Redon | G11B 5/3909 360/324.2 |
| 6,888,184 B1 * | 5/2005 | Shi | G11C 11/16 360/314 |
| 7,449,345 B2 | 11/2008 | Horng et al. | |
| 7,528,457 B2 | 5/2009 | Horng et al. | |
| 7,595,520 B2 | 9/2009 | Horng et al. | |
| 7,826,182 B2 * | 11/2010 | Carey | G11B 5/3906 360/324.12 |
| 8,385,026 B2 | 2/2013 | Carey et al. | |
| 2011/0031569 A1 | 2/2011 | Watts et al. | |
| 2011/0232079 A1 * | 9/2011 | Miyauchi et al. | 29/603.07 |
| 2011/0279923 A1 * | 11/2011 | Miyauchi et al. | 360/75 |
| 2013/0264665 A1 | 10/2013 | Jan et al. | |
| 2014/0048896 A1 | 2/2014 | Huang et al. | |

OTHER PUBLICATIONS

Natarajarathinam, A. et al.: "The Effect of Capping Layers on Anisotopy for Magnetic Tunnel Junctions"; University of Alabama Center for Materials for Information Technology; Dec. 2010; 1 page.

* cited by examiner

*Primary Examiner* — Craig A. Renner
(74) *Attorney, Agent, or Firm* — Patterson & Sheridan, LLP

(57) ABSTRACT

Embodiments disclosed herein generally relate to a TMR sensor for reading a recording from a magnetic recording medium using TMR, and in particular, to a magnetic capping structure of the TMR sensor. The sensor comprises a free layer and a magnetic capping structure. The magnetic capping structure comprises a ferromagnetic capping layer and an absorption layer formed on the ferromagnetic capping layer. The absorption layer is adapted to absorb molecules from the ferromagnetic capping layer and prevent the ferromagnetic capping layer from diffusing into the free layer.

20 Claims, 4 Drawing Sheets

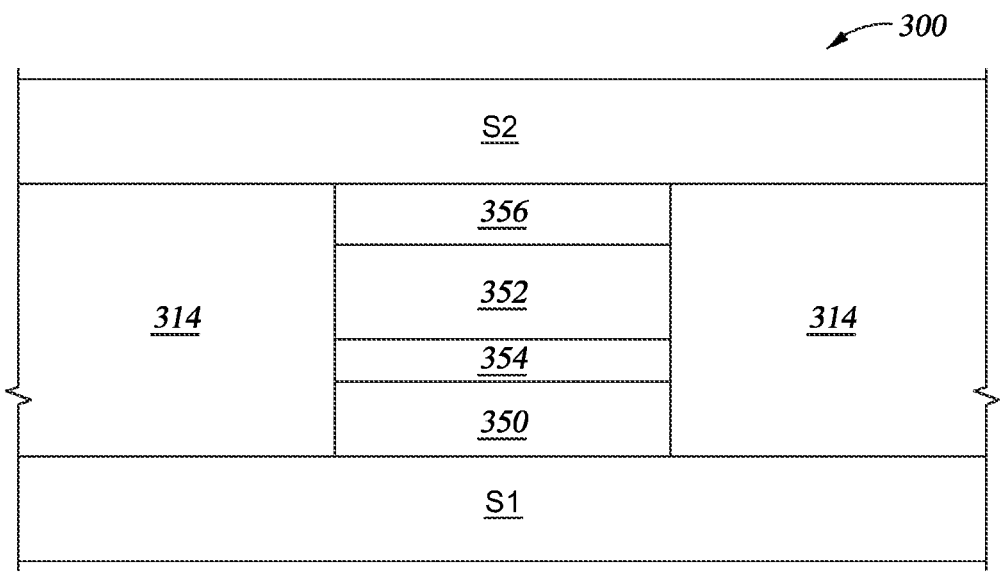
Fig. 3
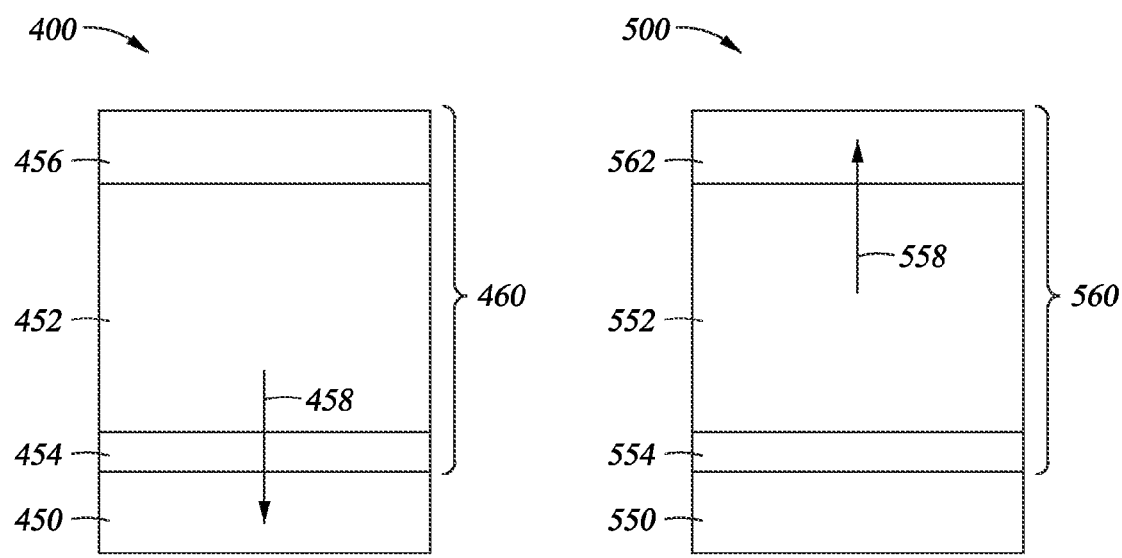
Fig. 4
(PRIOR ART)
Fig. 5

CONFINEMENT MAGNETIC CAP

BACKGROUND

1. Field

Embodiments disclosed herein generally relate to a tunneling magnetoresistance (TMR) sensor for reading a recording from a magnetic recording medium using TMR, and in particular, to a magnetic cap of the TMR sensor.

2. Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over a specific location on the rotating disk. The suspension arm biases the slider towards the surface of the disk when the disk is not rotating but, when the disk rotates, air is swirled by the rotating disk adjacent a media facing surface (MFS), such as an air bearing surface (ABS), of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

The read head typically utilizes a spin valve sensor, also referred to as a magnetoresistive sensor. One example of a magnetoresistive sensor is a TMR sensor. A TMR sensor may include a ferromagnetic layer, a pinned magnetic layer, a nonmagnetic coupling layer, a free magnetic layer, and a capping layer. In some cases, the capping layer is a multilayer structure separated from the free magnetic layer by a nonmagnetic spacer layer. The multilayer capping structure may comprise a ferromagnetic material layer and a nonmagnetic capping layer. The ferromagnetic material in the multilayer capping structure may diffuse through the nonmagnetic spacer layer into the free magnetic layer. Therefore, there is a need for an improved magnetoresistive sensor that prevents the ferromagnetic material layer of the capping structure from diffusing into the free magnetic layer of the sensor.

SUMMARY

Embodiments disclosed herein generally relate to a TMR sensor for reading a recording from a magnetic recording medium using TMR, and in particular, to a magnetic capping structure of the TMR sensor. The sensor comprises a free layer and a magnetic capping structure. The magnetic capping structure comprises a ferromagnetic capping layer and an absorption layer formed on the ferromagnetic capping layer. The absorption layer is adapted to absorb molecules from the ferromagnetic capping layer and prevent the ferromagnetic capping layer from diffusing into the free layer.

In one embodiment, a magnetic sensor comprises a free layer, a nonmagnetic spacer layer, and a magnetic capping structure formed on the nonmagnetic spacer layer. The magnetic capping structure comprises a ferromagnetic capping layer and an absorption layer formed on the ferromagnetic capping layer. The absorption layer is adapted to absorb molecules from the ferromagnetic capping layer.

In another embodiment, a magnetic recording device comprises a magnetic media, a magnetic read head disposed opposite the magnetic media, a magnetic write head coupled to the magnetic read head, and a magnetic read sensor coupled to the magnetic read head. The magnetic read sensor comprises a free layer, a nonmagnetic spacer layer, and a magnetic capping structure formed on the nonmagnetic spacer layer. The magnetic capping structure comprises a ferromagnetic capping layer and an absorption layer formed on the ferromagnetic capping layer. The absorption layer is adapted to absorb molecules from the ferromagnetic capping layer.

BRIEF DESCRIPTION OF THE DRAWINGS

So that the manner in which the above recited features can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

FIG. 3 is a schematic cross-sectional view of a TMR magnetic read sensor viewed from the MFS.

FIG. 4 illustrates a conventional structure of a magnetoresistive sensor.

FIG. 5 illustrates a magnetoresistive sensor having an absorption layer.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s).

Embodiments disclosed herein generally relate to a TMR sensor for reading a recording from a magnetic recording medium using TMR, and in particular, to a magnetic capping structure of the TMR sensor. The sensor comprises a free layer and a magnetic capping structure. The magnetic capping structure comprises a ferromagnetic capping layer and an absorption layer formed on the ferromagnetic capping layer. The absorption layer is adapted to absorb molecules from the ferromagnetic capping layer and prevent the ferromagnetic capping layer from diffusing into the free layer.

Figure 1:
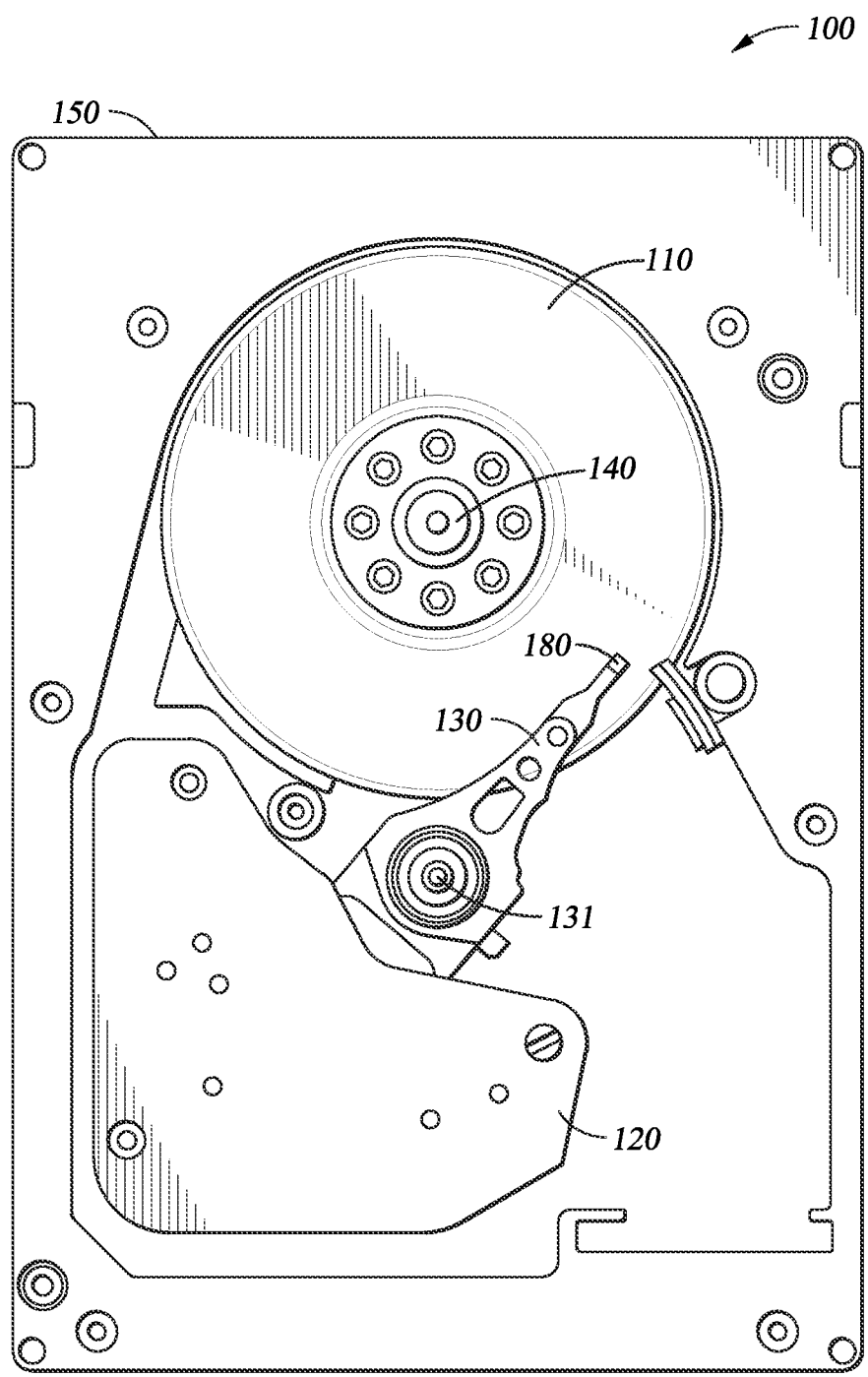
FIG. 1 illustrates an exemplary magnetic disk drive, according to an embodiment of the disclosure.

FIG. 1 illustrates a top view of an exemplary hard disk drive (HDD) 100, according to an embodiment of the disclosure. As illustrated, HDD 100 may include one or more magnetic disks 110, actuator 120, actuator arms 130 associated with each of the magnetic disks 110, and spindle motor 140 affixed in a chassis 150. The one or more magnetic disks 110 may be arranged vertically as illustrated in FIG. 1. Moreover, the one or more magnetic disks 110 may be coupled with the spindle motor 140.

Magnetic disks 110 may include circular tracks of data on both the top and bottom surfaces of the disk. A magnetic head 180 mounted on a slider may be positioned on a track. As each disk spins, data may be written on and/or read from the data track. Magnetic head 180 may be coupled to an actuator arm 130 as illustrated in FIG. 1. Actuator arm 130 may be configured to swivel around actuator axis 131 to place magnetic head 180 on a particular data track.

Figure 2:
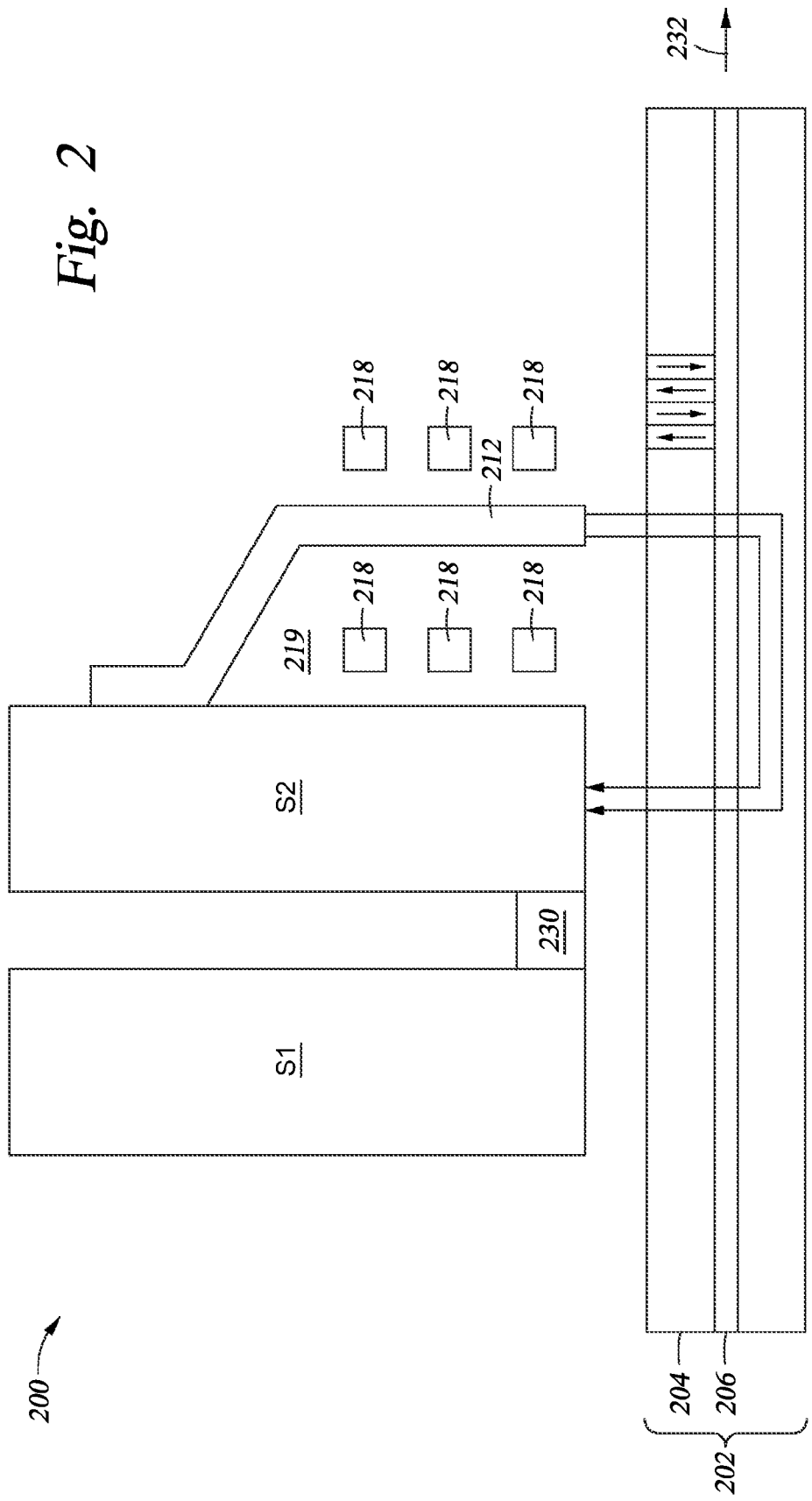
FIG. 2 is a side view of a read/write head and magnetic disk of the disk drive of FIG. 1, according to one embodiment of the disclosure.

FIG. 2 is a fragmented, cross-sectional side view through the center of a read/write head 200 facing magnetic disk 202. The read/write head 200 and magnetic disk 202 may correspond to the magnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (PL) 206. The read/write head 200 includes a MFS, a magnetic write head and a magnetic read head, and is mounted such that its MFS is facing the magnetic disk 202. In FIG. 2, the disk 202 moves past the head 200 in the direction indicated by the arrow 232. The RL 204 is illustrated with perpendicularly recorded or magnetized regions, with adjacent regions having magnetization directions, as represented by the arrows located in the RL 204. The magnetic fields of the adjacent magnetized regions are detectable by the sensing element 230 as the recorded bits. The write head includes a magnetic circuit made up of a main pole 212 and a thin film coil 218 shown in the section embedded in non-magnetic material 219. The read head includes the sensing element 230, which is located between shields S1 and S2.

FIG. 3 shows a schematic cross-sectional view of a TMR magnetic read sensor viewed from the MFS. The magnetic read sensor 300 is coupled to the first shield S1 and the second shield S2. The magnetic read sensor 300 may correspond to the sensing element 230 in FIG. 2. The shield layers S1, S2 may comprise a ferromagnetic material. Suitable ferromagnetic materials that may be utilized include Ni, Fe, Co, NiFe, NiFeCo, NiCo, CoFe and combinations thereof. The magnetic read sensor 300 may include a sensor structure comprising a free magnetic layer 350, a ferromagnetic capping layer 352, or pinned magnetic layer, a nonmagnetic spacer layer 354 and a cap layer 356. The cap layer 356 may be deposited over the ferromagnetic capping layer 352. The magnetic read sensor 300 may have side shields 314 disposed on both sides. The cap layer 356 may have a thickness of between about 20 Angstroms and about 150 Angstroms. The cap layer 356 may operate as a chemical mechanical polishing (CMP) stop layer to protect the sensor structure during the lift-off of the photoresist mask. The cap layer 356 may comprise a material to protect the sensor from damage such as ruthenium or tantalum. The ferromagnetic capping layer 352 may comprise ferromagnetic material such as Co, CoFe, NiFe or combinations thereof.

The layers of the sensor structure may be blanket deposited and then etched back. To etch back the layers, a diamond like carbon (DLC) layer and a photoresist mask may be formed thereover. The DLC layer is used to protect the sensor structure during a CMP process. The layers of the sensor structure may then be etched in the areas not covered by the photoresist mask. During the etching, material removed from the sensor structure may deposit on the photoresist mask as a hard, crust layer.

Once the layers of the sensor structure have been deposited and etched, side shields 314 may be deposited. Side shields 314 may include an insulating layer, a hard bias layer and a hard bias capping layer. A DLC layer may be deposited over the hard bias capping layer of the side shield 314. Once the DLC layer and the photoresist mask are removed, the second shield S2 is deposited.

FIG. 4 illustrates a magnetoresistive sensor 400 having a conventional structure. The conventional sensor 400 has a free layer 450 and a magnetic capping structure 460. The magnetic capping structure comprises a ferromagnetic layer 452, a capping layer 456 and a nonmagnetic spacer layer 454. In the conventional sensor 400, the ferromagnetic layer 452 comprises NiFe, the capping layer comprises Ru, and the nonmagnetic spacer layer 454 comprises Ta. The NiFe ferromagnetic layer 452 diffuses through the Ta nonmagnetic spacer layer 454 into the free layer 450. The diffusion of the NiFe ferromagnetic layer, represented by arrow 458, into the free layer 450 causes the magnetoresistance (MR) ratio of the sensor 400 to drop. The ferromagnetic capping layer 452 and the capping layer 456 are not limited to being NiFe and Ru, respectfully, and may be selected from the materials discussed above.

FIG. 5 illustrates a magnetoresistive sensor 500, according to one embodiment. Sensor 500 may be the sensor 300 in FIG. 3. The magnetic read sensor 500 comprises a free layer 550 and a magnetic capping structure 560 disposed on the free layer 550. The magnetic capping structure 560 is used for narrowing read gaps and for top bias. The magnetic capping structure 560 comprises a ferromagnetic capping layer 552 and an absorption layer 562 formed over the ferromagnetic capping layer 552. The absorption layer 562 absorbs molecules from the ferromagnetic capping layer 552, as shown by arrow 558. In the TMR sensor 500, the ferromagnetic capping layer 552 comprises NiFe and the absorption layer 562 comprises Ir. In another embodiment, the absorption layer 562 comprises Pd, Pt, or another equivalent element. The sensor 500 may have a thin nonmagnetic spacer layer 554 disposed between the free layer 550 and the ferromagnetic capping layer 552, comprising a third layer in the magnetic capping structure 560. The nonmagnetic spacer layer 554 may be Ta. The nonmagnetic spacer layer 554 may be excluded from the magnetic capping structure 560. The ferromagnetic capping layer 552 is not limited to being NiFe, and may be selected from the materials discussed above.

The Ir absorption layer 562 prevents the NiFe ferromagnetic layer 552 from diffusing into the free layer 550 by absorbing Ni molecules. The Ir absorption layer 562 is able to absorb the Ni molecules from the NiFe ferromagnetic layer 552 because the Ir absorption layer 562 forms a complete solid solution with the Ni molecules, meaning the bonds between the Ir and Ni molecules are relatively strong. The bonds between the Ir molecules and the Ni molecules are strong enough to prevent the NiFe ferromagnetic layer 552 from diffusing into the free layer 550. Other ferromagnetic materials having an FCC structure that may be used as the ferromagnetic capping layer include any ferromagnetic material containing nickel, such as Ni, NiCo, NiCoFe, NiFeW or NiFeTa, which could all form a complete solid solution with the absorption layer.

The Ru capping layer 456 from the conventional sensor 400 is unable to prevent the NiFe ferromagnetic layer 452 from diffusing into the free layer 450. Ni and Ru molecules do not form a complete solid solution, which means the bonds between the Ni and Ru molecules are relatively weak. Since the bonds between the Ni and Ru molecules are relatively weak, the Ru capping layer 456 does not effectively absorb Ni molecules from the NiFe ferromagnetic layer 452, and the NiFe ferromagnetic layer 452 diffuses into the free layer 450. The NiFe ferromagnetic layer 452 diffusing into the free layer 450 causes the MR ratio of the sensor 400 to drop. The Ru capping layer 456 may absorb Ni molecules from the NiFe ferromagnetic layer 452, but the Ru capping layer 456 is unable to absorb a sufficient amount of Ni molecules from the NiFe ferromagnetic layer 452 to prevent diffusion, or to be considered an absorption layer.

Determining whether a capping layer of a sensor can act as an absorption layer by absorbing molecules or if the capping layer allows the ferromagnetic capping layer to diffuse into the free layer is based on the cubic crystal system. For example, Ni has a face centered cubic (FCC) crystal lattice structure. Ir also has a FCC crystal lattice structure. Since both Ir and Ni have FCC structures, Ir and Ni form a complete solid solution with relatively strong bonds between the Ir and Ni molecules. The relatively strong bonds between the Ir and Ni molecules allow the Ir layer to absorb Ni molecules from the NiFe ferromagnetic layer, effectively preventing the NiFe ferromagnetic layer from diffusing into the free layer. Ru has a hexagonal close packed (HCP) crystal structure. Since Ru and Ni have different crystal structures, Ru and Ni do not form a complete solid solution. Thus, the Ru capping layer is unable to prevent the diffusion of the NiFe ferromagnetic layer into the free layer. Pt and Pd also have FCC crystal structures, which both form complete solid solutions with Ni, allowing Pt and Pd to function as efficient absorption layers. Rh, Cu, Ag, and Au also have FCC structures and may be other possible elements used as the absorption layer.

Figure 6:
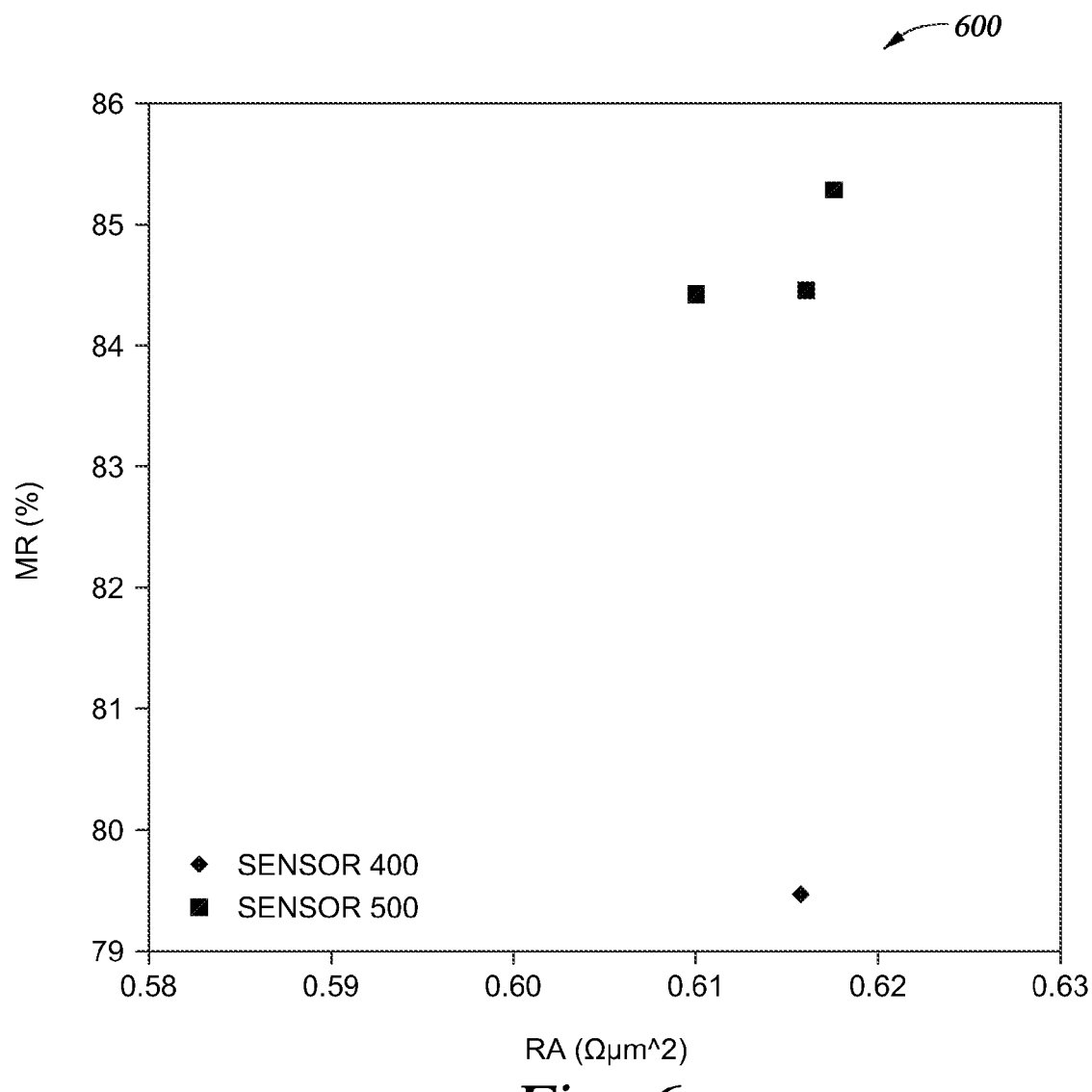
FIG. 6 is a graph of magnetoresistance ratio versus the resistance area product.

FIG. 6 is a graph 600 of the magnetoresistance ratio versus the resistance area product (RA). When both the conventional sensor 400 and the TMR sensor 500 of the current disclosure have an RA between about 0.61 $\Omega\mu m^2$ and 0.62 $\Omega\mu m^2$, the conventional sensor 400 has an average MR ratio of about 79.5% while the TMR sensor 500 has an average MR ratio of about 84.5%. The TMR sensor 500 has about a 5% higher MR ratio than the conventional sensor 400. TMR sensor 500 may have a MR ratio ranging between about 84% and 85.5%, as shown in the graph 600.

Since the Ru capping layer 456 of sensor 400 is unable to effectively absorb the Ni molecules, the magnetization between the Ru capping layer 456 and the NiFe ferromagnetic layer 452 of the conventional sensor 400 is larger than the magnetization between the Ir absorption layer 562 and the NiFe ferromagnetic layer 552 of the sensor 500 of the current disclosure. When the thickness of the NiFe ferromagnetic layer 452, 552 was varied from 4 nm, to 8 nm, to 12 nm, the magnetization between the Ru capping layer 456 and the NiFe ferromagnetic layer 452 of sensor 400 was about 1 T·nm larger than the magnetization between the Ir absorption layer 562 and the NiFe ferromagnetic layer 552 of sensor 500. The lower magnetization of sensor 500 indicates that the Ir absorption layer 562 effectively absorbs the Ni molecules.

The TMR sensor 500 may be formed by several different processes. In one such process, film-forming is carried out as far as the free layer 550 using a film-forming apparatus (deposition tool), after which the magnetic capping structure 560 is formed. Magnetic field annealing is then performed. In one embodiment, Ir was used for the absorption layer 562, NiFe was used for the ferromagnetic layer 552, and Ta was used for the nonmagnetic spacer layer 554. 2 nm of Ir, 8 nm of NiFe, and 0.1 nm of Ta were used to comprise the magnetic capping structure 560 of the TMR sensor 500. The Ta layer 554 is not essential, and is optional. Furthermore, the absorption layer 562 may also be Pd, Pt, or other equivalent element that forms a complete solid solution with Ni. After the TMR sensor 500 was formed, an evaluation of MR ratio and RA was then performed, and it was determined the TMR sensor 500 had a greater MR than the conventional sensor 400.

The sensor 500 is improved in numerous ways when the ferromagnetic layer 552 is prevented from diffusing into the free layer 550. The NiFe ferromagnetic layer 552 is prevented from diffusing into the free layer 550 by stacking an Jr absorption layer 562 on the NiFe ferromagnetic layer 552. The Jr absorption layer 562 and the NiFe ferromagnetic layer 552 form a complete solid solution due to the strong bonds between the Jr molecules and the Ni molecules, and MR improves as a result. The MR ratio of the sensor 500 of the current disclosure is about 5% greater than the conventional sensor 400. The read gap of sensor 500 becomes narrower, and is about 2 nm narrower than in the conventional sensor 400 when both sensors 400, 500 have a Ta layer of about 0.1 nm. Noise is also reduced in the TMR sensor 500 due to an increase in the effective volume of the free layer 550. The magnetoresistive sensor 500 is an overall improved sensor that prevents the ferromagnetic layer of from diffusing into the free layer.

While the foregoing is directed to exemplary embodiments, other and further embodiments of the disclosure may be devised without departing from the basic scope thereof, and the scope thereof is determined by the claims that follow.

What is claimed is:

1. A magnetoresistive sensor, comprising:
   a free layer formed directly on and in contact with a shield, wherein the shield comprises a ferromagnetic material and the free layer is directly on and in contact with the ferromagnetic material; and
   a magnetic capping structure formed on the free layer, the magnetic capping structure comprising:
      a ferromagnetic capping layer; and
      an absorption layer formed on the ferromagnetic capping layer and adapted to absorb molecules from the ferromagnetic capping layer, wherein the ferromagnetic capping layer is disposed between the free layer and the absorption layer.

2. The magnetoresistive sensor of claim 1, wherein the absorption layer comprises Ir.

3. The magnetoresistive sensor of claim 1, wherein a magnetoresistance ratio of the sensor is between about 84% and about 85.5%.

4. The magnetoresistive sensor of claim 1, wherein the magnetic capping structure further comprises a nonmagnetic spacer layer disposed between the free layer and the ferromagnetic capping layer.

5. The magnetoresistive sensor of claim 4, wherein the nonmagnetic spacer layer is Ta.

6. The magnetoresistive sensor of claim 1, wherein the ferromagnetic capping layer is NiFe.

7. The magnetoresistive sensor of claim 1, wherein the ferromagnetic capping layer is between about 4 nm and about 12 nm thick.

8. The magnetoresistive sensor of claim 1, wherein the absorption layer is between about 1.5 nm and about 2 nm thick.

9. The magnetoresistive sensor of claim 1, wherein the absorption layer comprises Pd.

10. The magnetoresistive sensor of claim 1, wherein the absorption layer comprises Pt.

11. A magnetic recording device, comprising:
    a magnetic media;

a magnetic read head disposed opposite the magnetic media;

a magnetic write head coupled to the magnetic read head; and a magnetoresistive sensor coupled to the magnetic read head, the magnetoresistive sensor comprising;

a free layer formed directly on and in contact with a first shield, wherein the first shield comprises a ferromagnetic material and the free layer is directly on and in contact with the ferromagnetic material; and a magnetic capping structure formed on the free layer, the magnetic capping structure comprising:

a ferromagnetic capping layer; and an absorption layer formed on the ferromagnetic capping layer and adapted to absorb molecules from the ferromagnetic capping layer, wherein the ferromagnetic capping layer is disposed between the free layer and the absorption layer.

12. The magnetic recording device of claim 11, wherein the absorption layer comprises Ir.

13. The magnetic recording device of claim 11, wherein a magnetoresistance ratio of the magnetoresistive sensor is between about 84% and about 85.5%.

14. The magnetic recording device of claim 11, wherein the first shield and a second shield are coupled to the magnetic read head, and wherein the sensor is disposed between the first shield and the second shield.

15. The magnetic recording device of claim 11, wherein the magnetic capping structure further comprises a nonmagnetic spacer layer disposed between the free layer and the ferromagnetic capping layer.

16. The magnetic recording device of claim 15, wherein the nonmagnetic spacer layer is Ta.

17. The magnetic recording device of claim 11, wherein the ferromagnetic capping layer is NiFe.

18. The magnetic recording device of claim 11, wherein the ferromagnetic capping layer is between about 4 nm and about 12 nm thick.

19. The magnetic recording device of claim 11, wherein the absorption layer is between about 1.5 nm and about 2 nm thick.

20. The magnetic recording device of claim 11, wherein the absorption layer comprises Pd or Pt.

* * * * *